(12) United States Patent
Nakano et al.

(10) Patent No.: US 11,320,050 B2
(45) Date of Patent: May 3, 2022

(54) STRUCTURE FOR MOUNTING GASKET ON BLOCK

(71) Applicant: NIPPON PILLAR PACKING CO., LTD., Osaka (JP)

(72) Inventors: Atsushi Nakano, Osaka (JP); Toshihide Iida, Osaka (JP); Tomoyuki Koike, Osaka (JP); Tomohiro Adachi, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 3 days.

(21) Appl. No.: 16/954,290

(22) PCT Filed: Feb. 18, 2019

(86) PCT No.: PCT/JP2019/005754
§ 371 (c)(1),
(2) Date: Jun. 16, 2020

(87) PCT Pub. No.: WO2019/163690
PCT Pub. Date: Aug. 29, 2019

(65) Prior Publication Data
US 2021/0088141 A1 Mar. 25, 2021

(30) Foreign Application Priority Data

Feb. 23, 2018 (JP) .............................. JP2018-031303
Feb. 23, 2018 (JP) .............................. JP2018-031304
Feb. 23, 2018 (JP) .............................. JP2018-031305

(51) Int. Cl.
*F16J 15/06* (2006.01)
*F16L 23/22* (2006.01)
*F16J 15/10* (2006.01)

(52) U.S. Cl.
CPC ............ *F16J 15/062* (2013.01); *F16J 15/061* (2013.01); *F16L 23/22* (2013.01); *F16J 15/104* (2013.01)

(58) Field of Classification Search
CPC ...... F16J 15/061; F16J 15/062; F16J 15/0887; F16J 15/104; F16L 23/18; F16L 23/22
See application file for complete search history.

(56) References Cited

U.S. PATENT DOCUMENTS 5,431,417 A * 7/1995 Dahlgren ................ F16L 23/20
277/614
5,536,018 A 7/1996 Szott
(Continued)

FOREIGN PATENT DOCUMENTS

JP   2006-316805 A    11/2006
JP   2011-104158 A     6/2011
(Continued)

OTHER PUBLICATIONS

International Search Report dated May 14, 2019 in PCT/JP2019/005754 filed Feb. 18, 2019, 1 page.

*Primary Examiner* — Nicholas L Foster
(74) *Attorney, Agent, or Firm* — Oblon, McClelland, Maier & Neustadt, L.L.P.

(57) ABSTRACT

A structure for mounting a gasket on a block includes a block with a fluid channel and an annular gasket surrounding an opening of the fluid channel. The block has an annular inner wall and an annular outer wall. The annular inner wall is made of resin and located radially outside the opening of the fluid channel. The annular outer wall is made of resin and located radially outside the annular inner wall. The annular inner wall and the annular outer wall allow an axial side of the gasket to be press-fitted therebetween and are elastically deformable in their radial directions.

11 Claims, 17 Drawing Sheets

(56) References Cited

U.S. PATENT DOCUMENTS

| | | | | |
|---|---|---|---|---|
| 7,581,764 B2* | 9/2009 | Ishihara | | F16J 15/062 |
| | | | | 285/331 |
| 8,033,579 B2* | 10/2011 | Takeda | | F16L 23/06 |
| | | | | 285/367 |
| 9,045,961 B2* | 6/2015 | Melancon | | E21B 33/06 |
| 10,415,729 B2* | 9/2019 | Stobbart | | F16L 23/20 |
| 11,067,175 B2* | 7/2021 | Adachi | | F16L 17/073 |
| 11,158,521 B2* | 10/2021 | Melcer | | F16J 15/104 |
| 11,158,522 B2* | 10/2021 | Melcer | | F16J 15/106 |
| 2001/0045709 A1* | 11/2001 | Stobbart | | F16J 15/062 |
| | | | | 277/602 |
| 2007/0262581 A1* | 11/2007 | Ishihara | | F16K 27/003 |
| | | | | 285/10 |
| 2008/0000533 A1* | 1/2008 | Katsura | | F16L 39/00 |
| | | | | 137/594 |
| 2009/0091125 A1* | 4/2009 | Takeda | | B25B 27/10 |
| | | | | 285/88 |
| 2010/0013213 A1* | 1/2010 | Katsura | | F16L 39/005 |
| | | | | 285/29 |
| 2010/0320699 A1* | 12/2010 | Takeda | | F16L 23/22 |
| | | | | 277/612 |
| 2011/0266797 A1* | 11/2011 | Stobbart | | F16L 23/20 |
| | | | | 285/363 |
| 2015/0176744 A1* | 6/2015 | Glassman | | F16J 15/002 |
| | | | | 277/609 |
| 2019/0301608 A1* | 10/2019 | Takeda | | F16J 15/062 |
| 2019/0368609 A1* | 12/2019 | Adachi | | F16J 15/102 |
| 2019/0368611 A1* | 12/2019 | Nakano | | F16J 15/102 |
| 2019/0390772 A1* | 12/2019 | Nakano | | F16J 15/062 |
| 2019/0390773 A1* | 12/2019 | Adachi | | F16J 15/062 |
| 2020/0408305 A1* | 12/2020 | Adachi | | F16J 15/106 |
| 2021/0054932 A1* | 2/2021 | Koike | | F16J 15/062 |
| 2021/0159093 A1* | 5/2021 | Melcer | | F16J 15/106 |
| 2021/0193487 A1* | 6/2021 | Melcer | | F16J 15/106 |

FOREIGN PATENT DOCUMENTS

| | | |
|---|---|---|
| JP | 2013-93631 A | 5/2013 |
| JP | 2017-25992 A | 2/2017 |

* cited by examiner

STRUCTURE FOR MOUNTING GASKET ON BLOCK

TECHNICAL FIELD

The invention relates to structures for mounting gaskets on blocks.

BACKGROUND ART

A structure for mounting a gasket on a base by using an adhesive is known, for example, as described in Patent Literature 1.

CITATION LIST

Patent Literature

Patent Literature 1: JP 2017-025992 A

SUMMARY OF INVENTION

A structure for mounting a gasket on a block is known, in which the block includes a fluid channel to allow fluid to pass therein. To the block, the gasket is mounted such that an axial side of its annular shape is press-fitted in a groove around an opening of the fluid channel of the block.

When the block of the structure is manufactured by resin molding, the portion of the block to receive the press-fitted portion of the gasket often fails to be formed in a concave shape that can smoothly accept the axial side of the gasket.

In contrast to the axial side of the gasket having a circular-cylindrical shape, the portion of the block to receive the press-fitted portion of the gasket often fails to have a circular-cylindrical shape, but generally has an elliptic-cylindrical shape. Such a circular-cylindrical shape is necessary for the portion of the block to smoothly accept the press-fitted portion of the gasket.

The main reason why the portion of the block fails to have a circular-cylindrical shape seems to be contraction of resin material during resin molding of the portion of the block. Even when the portion of the block fails to have a circular-cylindrical shape, forcibly press-fitting the axial side of the gasket into the portion of the block can connect the block with another block or the like.

However, difference in shape between the portion of the block and the axial side of the gasket causes the axial side of the gasket to insufficiently fit the portion of the block. This can result in a region of reduced adhesion, thus preventing the gasket and the block from achieving high sealing performance.

In view of the above-mentioned problems, the invention is devised. An object of the invention is to enhance sealing performance of a structure for mounting a gasket on a block.

A structure for mounting a gasket on a block according to a first aspect of the invention includes a block with a fluid channel and an annular gasket surrounding an opening of the fluid channel. The block includes an annular inner wall made of resin and located radially outside an opening of the fluid channel, and an annular outer wall made of resin and located radially outside the annular inner wall. The annular inner wall and the annular outer wall allow an axial side of the gasket to be press-fitted therebetween and are elastically deformable in their radial directions.

The structure enables the gasket to be mounted on the block such that the axial side of the gasket is press-fitted between the annular inner wall and the annular outer wall of the block. When press-fitted, the axial side of the gasket can elastically deform at least one of the annular inner and outer walls in their radial directions. This enables the annular inner and outer walls to be more flexible to the axial side of the gasket press-fitted therebetween. After press-fitted, the axial side of the gasket can press substantially the whole periphery of at least one of the annular inner and outer walls by a substantially uniform force. This enables the gasket mounted on the block to achieve higher sealing performance.

The annular inner wall may be thinner than the annular outer wall. The annular inner wall may be 0.72 mm to 6 mm in thickness. The radial thickness f of the annular inner wall and the radial thickness b of the annular outer wall may fall within a range defined by the following equations (1) and (2):

$$b = 2.41f + 0.24, \quad (1)$$

$$b = 1.45f + 0.14. \quad (2)$$

The annular inner wall may be 0.72 mm to 6 mm in thickness, and the annular outer wall may be 1.24 mm to 14.6 mm in thickness. The annular inner wall and the annular outer wall may protrude from a reference surface perpendicular to their respective axial directions to the same direction. The annular inner wall may protrude from the reference surface by 1.76 mm to 13.2 mm. The annular outer wall may protrude from the reference surface by 1.8 mm to 12.4 mm.

A structure for mounting a gasket on a block according to a second aspect of the invention includes a block with a fluid channel and a gasket surrounding an opening of the fluid channel. The block includes an annular wall made of resin and located radially outside the opening of the fluid channel and an axial side of the gasket. The annular wall allows the axial side of the gasket to be press-fitted therein and is elastically deformable in its radial direction.

The structure enables the gasket to be mounted on the block such that the axial side of the gasket is press-fitted in the annular wall of the block. When press-fitted, the axial side of the gasket can elastically deform the annular wall in its radial direction. This enables the annular wall to be more flexible to the axial side of the gasket press-fitted therein. After press-fitted, the axial side of the gasket can press substantially the whole periphery of the annular wall by a substantially uniform force. This enables the gasket mounted on the block to achieve higher sealing performance.

The annular wall may be 1.24 mm to 14.6 mm in thickness. The annular wall may be 1.8 mm to 12.4 mm in axial length. The annular wall may have an inner diameter of 5 mm to 60 mm. An inner diameter a of the annular wall and a radial thickness b of the annular wall may fall within a range defined by the following equations (3) and (4):

$$b = 0.17a + 4.4, \quad (3)$$

$$b = 0.08a + 0.84. \quad (4)$$

The annular wall may have an inner diameter of 5 mm to 60 mm. The inner diameter a of the annular wall and the axial length c of the annular wall may fall within a range defined by the following equations (5) and (6):

$$c = 0.17a + 2.2, \quad (5)$$

$$c = 0.1a + 1.3. \quad (6)$$

The annular wall may be made of a material with a modulus of elasticity of 200 MPa to 3200 MPa.

A structure for mounting a gasket on a block according to a third aspect of the invention includes a block with a fluid channel and a gasket surrounding an opening of the fluid channel. The block includes an annular wall made of resin and located radially outside the opening of the fluid channel and radially inside an axial side of the gasket. At least a portion of the annular wall is press-fitted in the axial side of the gasket and is elastically deformable in its radial direction.

The structure enables the gasket to be mounted on the block such that at least a portion of the annular wall of the block is press-fitted in the axial side of the gasket. When receiving the press-fitted portion of the annular wall, the axial side of the gasket can elastically deform the annular wall in its radial direction. This enables the annular wall to be more flexible to the axial side of the gasket. After press-fitted, the portion of the annular wall can press substantially the whole periphery of the axial side of the gasket by a substantially uniform force. This enables the gasket mounted on the block to achieve higher sealing performance.

The annular wall may be 0.72 mm to 6 mm in thickness. The annular wall may be 1.76 mm to 13.2 mm in axial length. The annular wall may have an inner diameter of 2 mm to 50 mm. The inner diameter e of the annular wall and the radial thickness f of the annular wall may fall within a range defined by the following equations (7) and (8):

$$f=0.10e+1.0, \quad (7)$$

$$f=0.06e+0.6. \quad (8)$$

The annular wall may have an inner diameter of 2 mm to 50 mm. The inner diameter e of the annular wall and the axial length g of the annular wall may fall within a range defined by the following equations (9) and (10):

$$g=0.21e+2.7, \quad (9)$$

$$g=0.13e+1.5. \quad (10)$$

The annular wall may be made of a material with a modulus of elasticity of 200 MPa to 3200 MPa.

The invention can enhance the sealing performance of the structure for mounting the gasket on the block.

DESCRIPTION OF EMBODIMENTS

A structure for mounting a gasket on a block according to the invention can be used in fields of, for example, semiconductors, liquid crystals, organic electroluminescent devices, medical and pharmaceutical supplies, or automobiles.

The structure for mounting a gasket on a block according to the invention can be also used in fields other than the above-listed ones, for many purposes.

Figure 1:
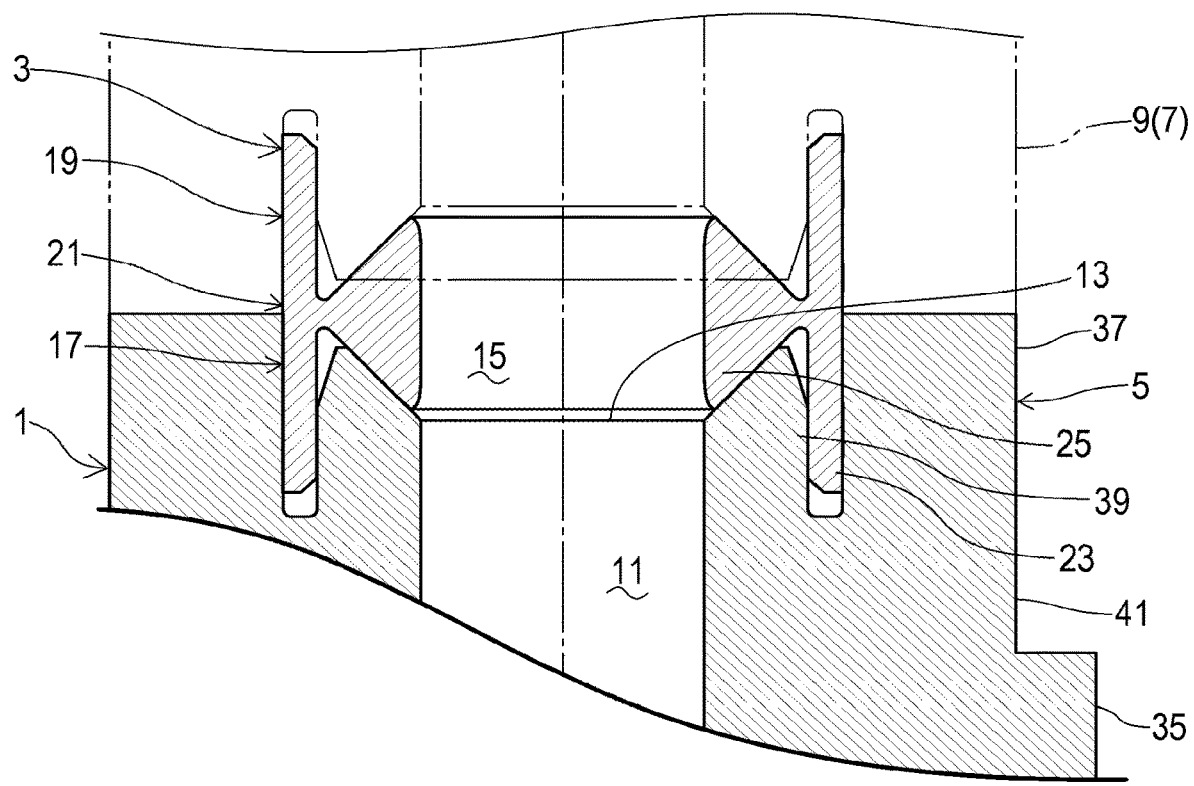
FIG. 1 is a cross-sectional view of a structure for mounting a gasket on a block according to an embodiment of the invention.
Figure 2:
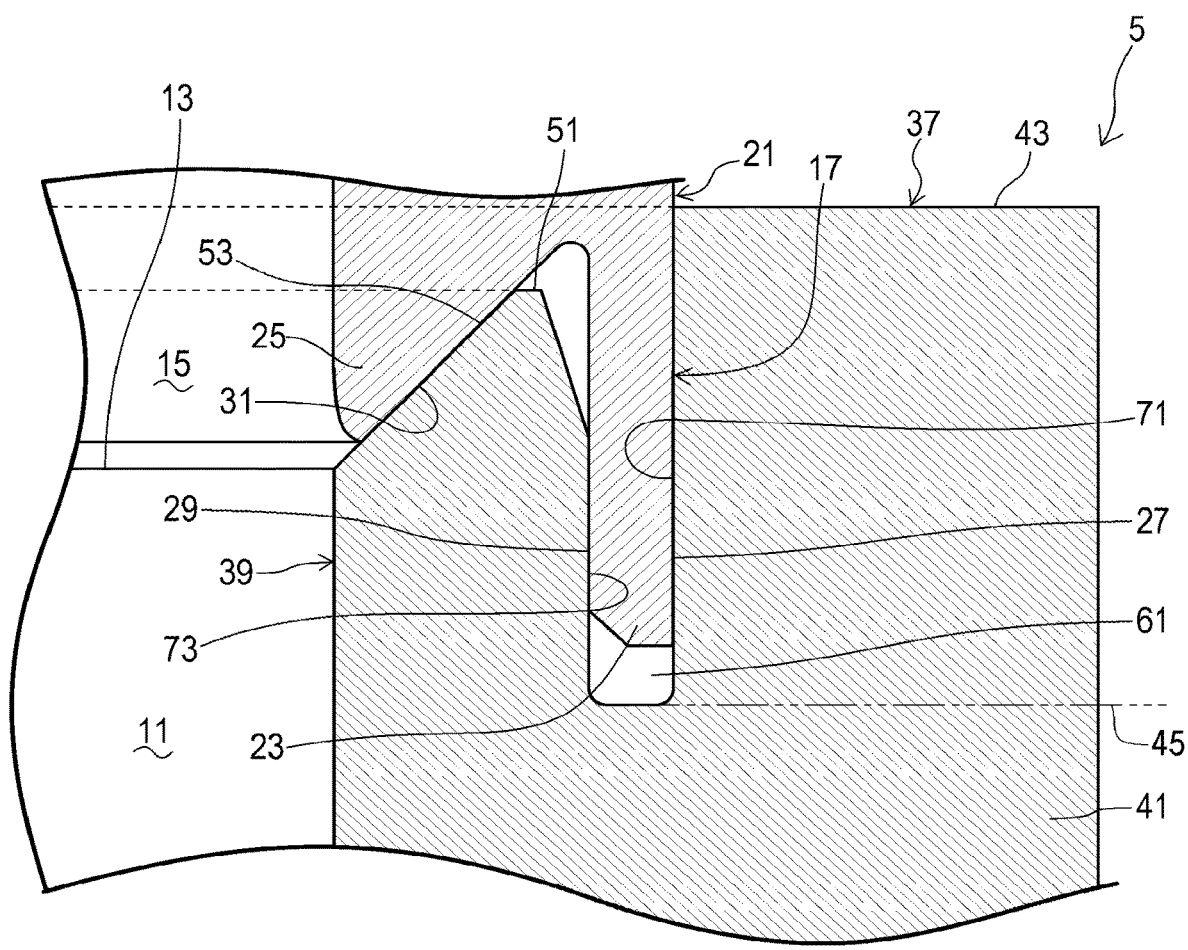
FIG. 2 is a partially enlarged view of FIG. 1.

FIG. 1 is a cross-sectional view of the structure for mounting a gasket on a block according to an embodiment of the invention. FIG. 2 is a partially enlarged view of FIG. 1.

As shown in FIGS. 1 and 2, the structure includes a block 1 and an annular gasket 3. The gasket 3 is mounted on annular walls 5 of the block 1.

With the gasket 3 mounted on the block 1, the block 1 is coupled to another block 7 such that the gasket 3 is placed between the annular walls 5 of the block 1 and annular walls 9 of the other block 7. Due to the presence of the gasket 3 between adjacent fluid devices such as the blocks 1 and 7, the fluid devices adhere to each other.

Blocks according to the invention only have to be ones with fluid channels. The blocks may be parts of larger blocks, or assemblies of smaller blocks.

The gasket 3 surrounds an opening 13 at one end of a first fluid channel 11 of the block 1. The gasket 3 is pressed on and engaged with the rim of the opening 13 of the first fluid channel 11 of the block 1.

The gasket 3 has a second fluid channel 15, which is connected to the first fluid channel 11 through the opening 13. The gasket 3 has a shape symmetric around an axis.

The gasket 3 is formed in a cylindrical shape. The gasket 3 has a first axial side 17 and a second axial side 19 opposite to each other and an axially intermediate portion 21 between the first axial side 17 and the second axial side 19.

The first axial side 17 of the gasket 3 has an annular sealing tip 23 and an annular tapered protrusion 25. The sealing tip 23 of the gasket 3 is substantially coaxial with the block 1 and located around the tapered protrusion 25.

The sealing tip 23 is formed in a cylindrical shape with substantially constant radial thickness. The sealing tip 23 protrudes from the axially intermediate portion 21 of the gasket 3 toward a first axial direction of the gasket 3, i.e. downward.

An outer periphery of the sealing tip 23 is an outer periphery of the first axial side 17 of the gasket 3 and has an outer contact surface 27. An inner periphery of the sealing tip 23 has an inner contact surface 29.

The tapered protrusion 25 is formed in a cylindrical shape with varying radial thickness. The tapered protrusion 25 protrudes from the axially intermediate portion 21 of the gasket 3 toward the same direction as the sealing tip 23, i.e. toward the first axial direction of the gasket 3.

The tapered protrusion 25 is placed at a distance from the sealing tip 23 radially inward. The tapered protrusion 25 protrudes from the axially intermediate portion 21 of the gasket 3 by a length shorter than the sealing tip 23.

The tapered protrusion 25 is formed such that its outer diameter gradually reduces with increased distances from the axially intermediate portion 21 of the gasket 3 in the first axial direction. This results in a tapered outer contact surface 31 on an outer periphery of the tapered protrusion 25.

The gasket 3 allows the annular walls 5 to have a portion be elastically deformed when the gasket 3 is press-fitted in the annular walls 5, as described later.

The gasket 3 according to the embodiment is made of, for example, fluororesin, which is thermoplastic resin, such as perfluoroalkoxy alkane (PFA) or polytetrafluoroethylene (PTFE). As usage, the gasket 3 may be made of, for example, polypropylene (PP), high-density polyethylene (HDPE), low-density polyethylene (LDPE), polyoxymethylene (POM), or rubber (i.e. elastomer).

Figure 3:
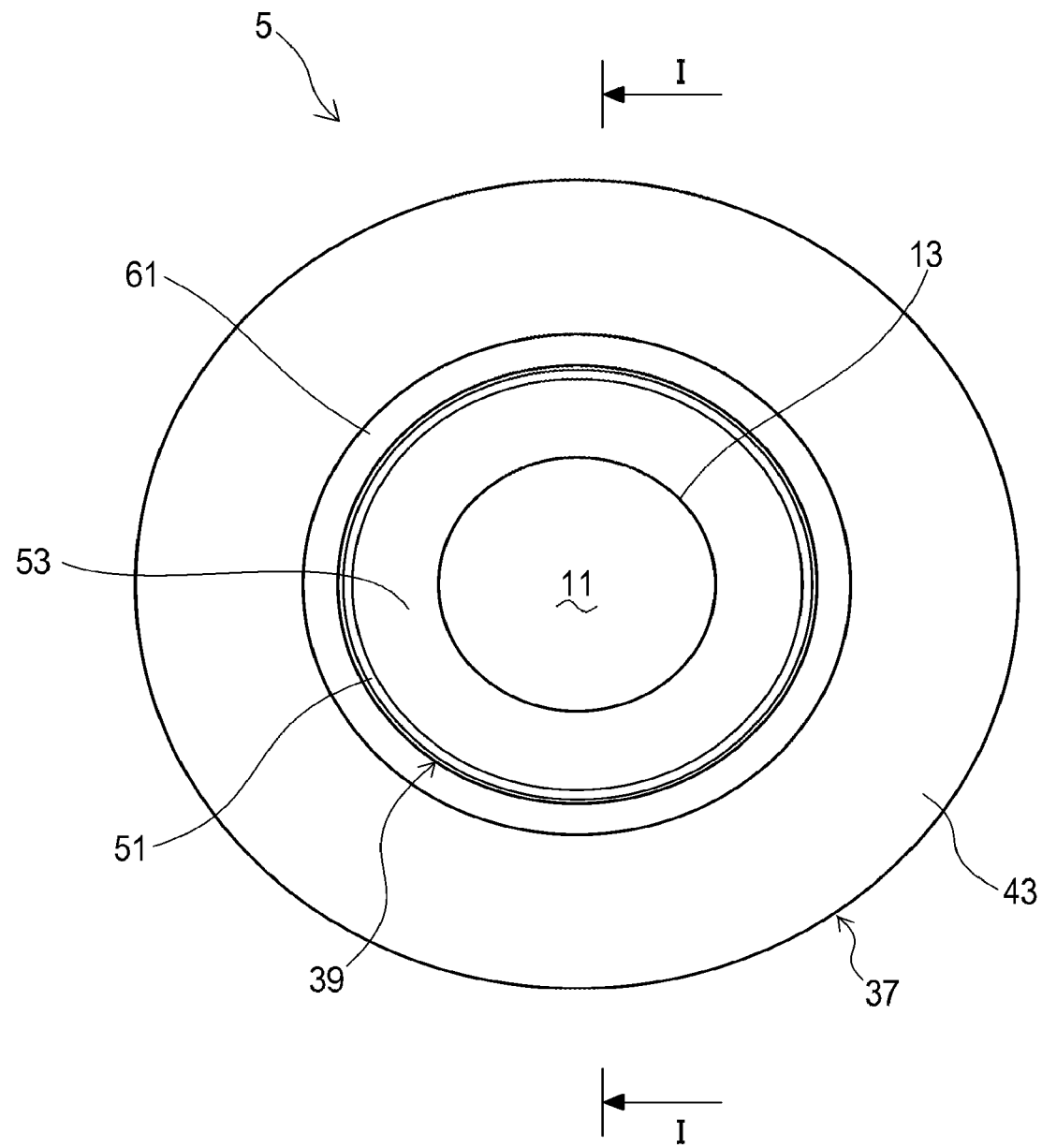
FIG. 3 is a view of the annular walls of the block of FIG. 1 from an axial direction.
Figure 4:
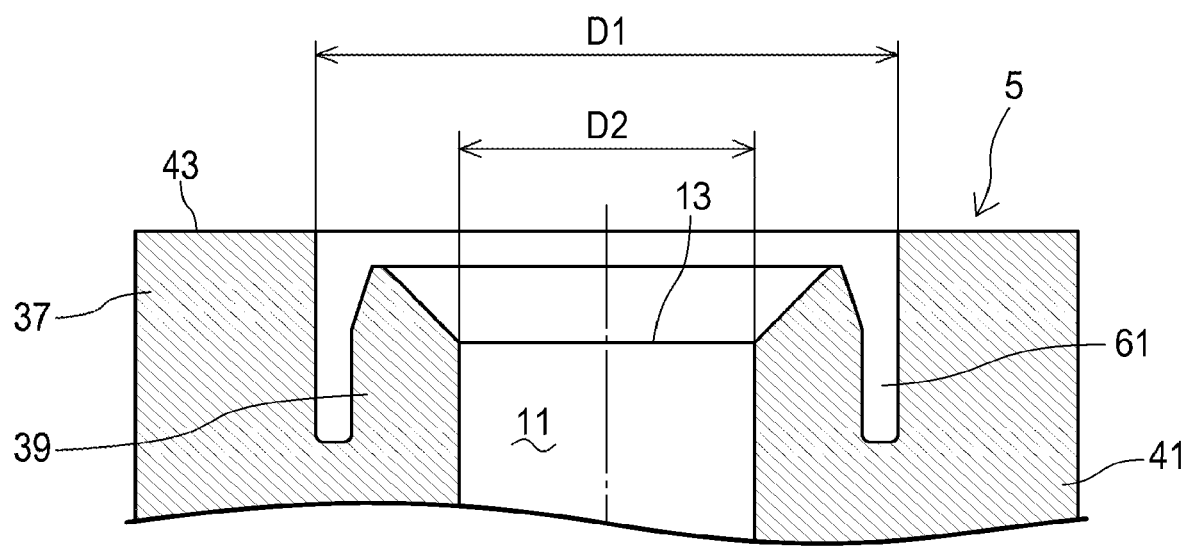
FIG. 4 is a cross-sectional view taken along the lines I-I of FIG. 3.
Figure 5:
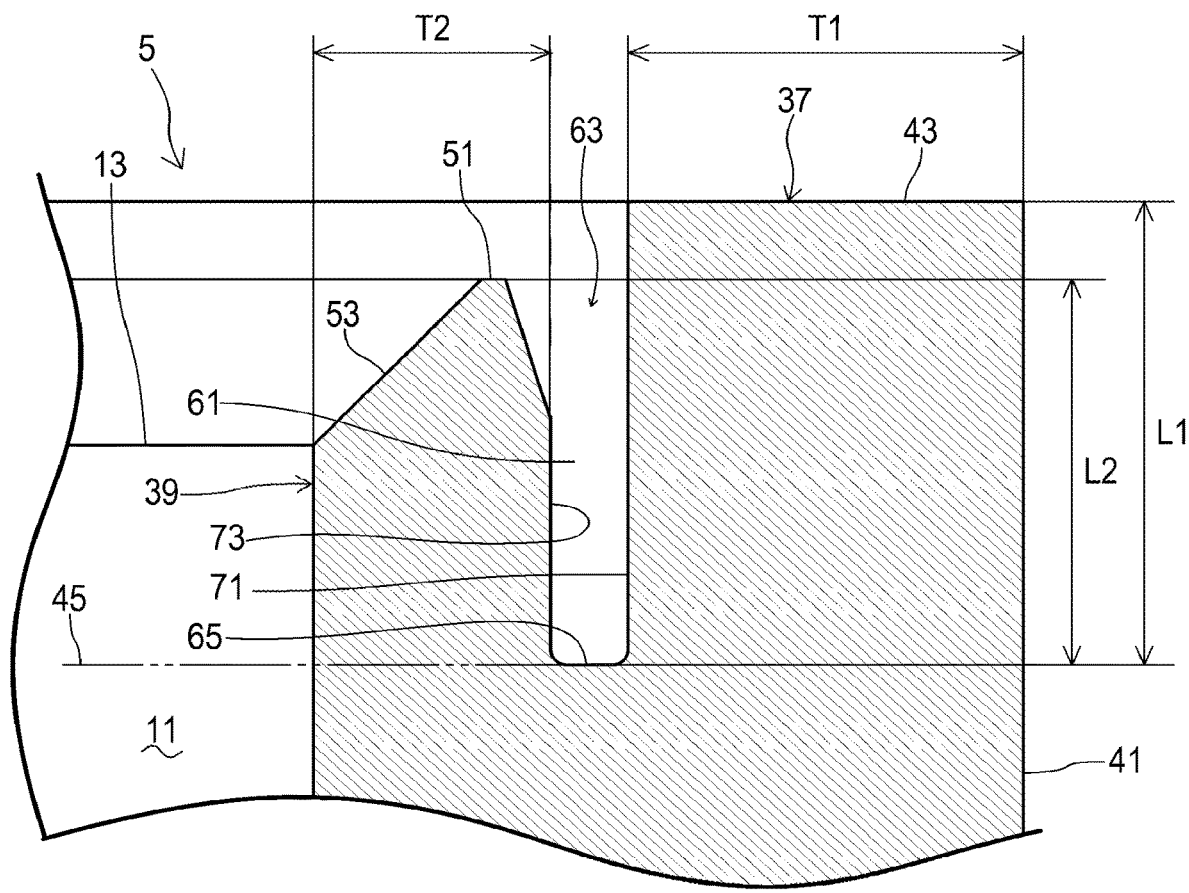
FIG. 5 is a partially enlarged view of FIG. 4.

FIG. 3 is a view of the annular walls 5 of the block 1 when viewed from the second axial direction, i.e. from above. FIG. 4 is a cross-sectional view taken along the lines I-I of FIG. 3. FIG. 5 is a partially enlarged view of FIG. 4.

As shown in FIGS. 3, 4, and 5, the block 1 has the first fluid channel 11. In the block 1, the opening 13 of the first fluid channel 11 is exposed, and one end of the first fluid channel 11 is connected to the second fluid channel 15 of the gasket 3.

The first fluid channel 11 is located inside a body 35 of the block 1 as shown in FIG. 1. The first fluid channel 11 extends inside the annular walls 5 such that its one end is located inside the annular walls 5 of the block 1.

Inside the annular walls 5, the first fluid channel 11 has a circular cross section and extends in an axial direction of the annular walls 5, i.e. a vertical direction in FIG. 1. The opening 13 of the first fluid channel 11 is located at the second axial end (i.e. an upper end) of the annular walls 5.

The annular walls 5 are formed in a cylindrical shape. The annular walls 5 protrude from the body 35 toward its second axial direction, i.e. upward. The annular walls 5 are coaxial with the first fluid channel 11, and their axial direction is a vertical direction.

When the gasket 3 surrounds the opening 13 of the first fluid channel 11, the annular walls 5 can engage with the gasket 3 such that their second axial side, i.e. their upper side is pressed on the gasket 3.

The annular walls 5 have an outer diameter larger than the first axial side 17 of the gasket 3, i.e. the sealing tip 23. The annular walls 5 have an inner diameter substantially the same as that of the first axial side 17 of the gasket 3.

Figure 6:
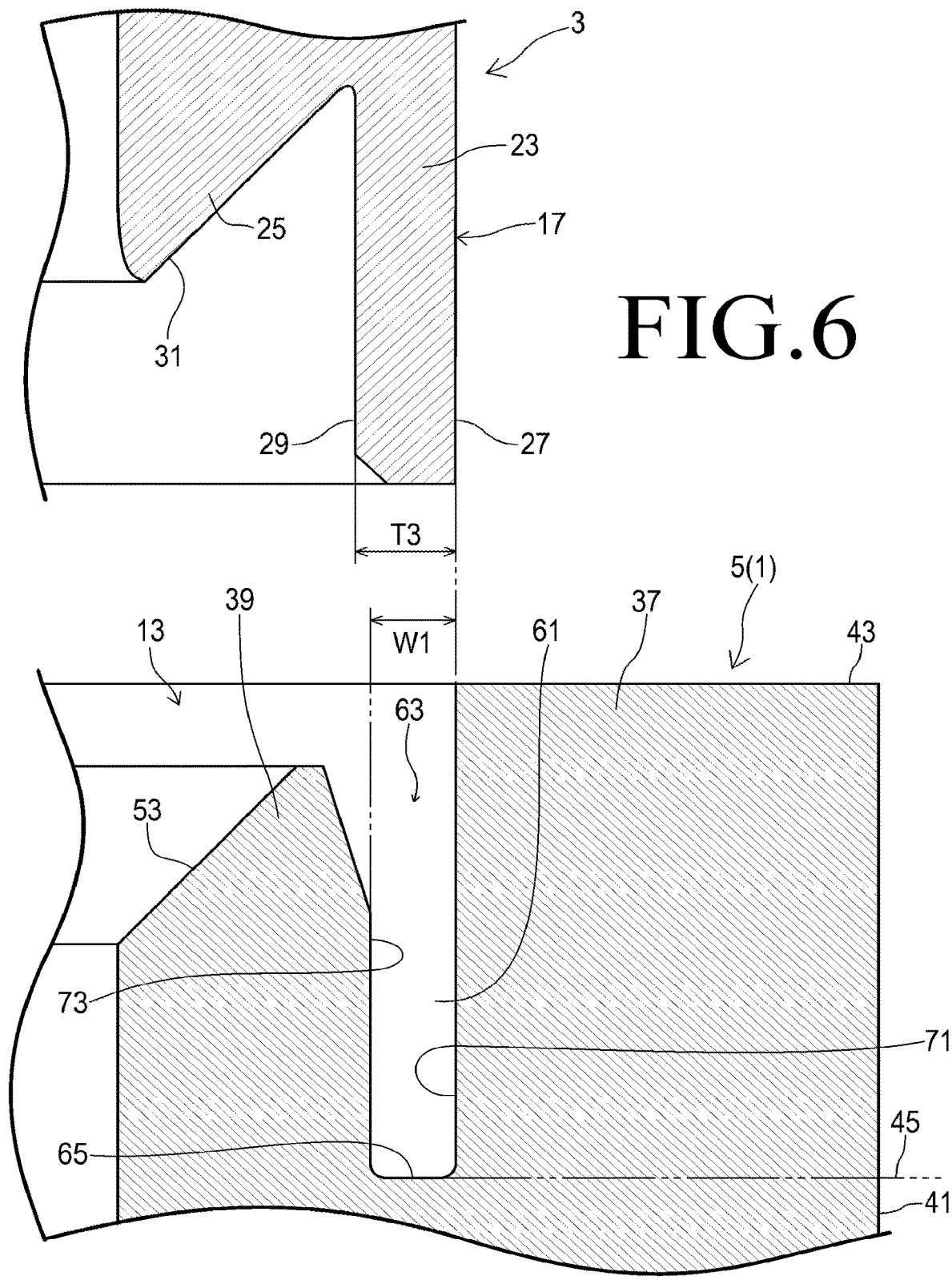
FIG. 6 is a cross-sectional view of a first example showing a design of annular walls of the block and a first axial side of the gasket of FIG. 1.

FIG. 6 is a cross-sectional view of a design of the annular walls 5 of the block 1, i.e. an annular outer wall 37 and an annular inner wall 39, and the first axial side 17 of the gasket 3, esp. the sealing tip 23.

As shown in FIG. 6, the annular walls 5 include the annular outer wall 37 and the annular inner wall 39, which are made of resin. These walls 37 and 39 are located radially outside the opening 13 of the first fluid channel 11.

The annular inner wall 39 is located radially outside the opening 13 of the first fluid channel 11, i.e. around the opening 13. The annular outer wall 37 is located radially outside the annular inner wall 39, i.e. around the annular inner wall 39.

The annular outer wall 37 allows the first axial side 17 of the gasket 3 to be press-fitted therein. The annular inner wall 39 can be at least partially press-fitted in the first axial side 17 of the gasket 3.

In other words, the annular outer wall 37 and the annular inner wall 39 allow the first axial side 17 of the gasket 3 to be press-fitted therebetween.

When the first axial side 17 of the gasket 3 is press-fitted, the annular outer wall 37 is located radially outside the first axial side 17 of the gasket 3, i.e. the sealing tip 23, and the annular inner wall 39 is located radially inside the first axial side 17 of the gasket 3, i.e. the sealing tip 23.

The annular outer wall 37 has a shape that can receive the sealing tip 23 therein. The annular outer wall 37 has an opening on the second axial side of the annular walls 5, i.e. on their upper side.

The annular outer wall 37 protrudes from a base 41 of the annular walls 5 upward. The annular outer wall 37 has an end surface 43, i.e. a top surface around the opening 13 of the first fluid channel 11. The end surface 43 is flat.

The annular outer wall 37 is formed in a cylindrical shape with substantially constant radial thickness. The annular outer wall 37 has an inner diameter substantially the same as the outer diameter of the sealing tip 23.

The annular outer wall 37 is elastically deformable in its radial direction. The annular outer wall 37 is elastically deformed by the sealing tip 23, i.e. the first axial side 17 of the gasket 3, press-fitted therein.

Due to the sealing tip 23 press-fitted, the annular outer wall 37 can be elastically deformed in its radial direction such that a segment of the annular outer wall 37 can move separately from other segments to fit the profile of the sealing tip 23.

Suppose that the annular outer wall 37 fails to have a circular-cylindrical shape in contrast to the sealing tip 23 in a circular-cylindrical shape. In this case, some segments of the annular outer wall 37 can be elastically deformed radially outward and other segments can be elastically deformed radially inward to fit the profile of the sealing tip 23.

The thickness T1 of the annular outer wall 37, cf. FIG. 5, falls within the range from 1.24 mm to 14.6 mm. The thickness T1 of the annular outer wall 37 means the radial length of each segment of the annular outer wall 37.

The thickness T1 of the annular outer wall 37 is designed to be substantially constant within almost the whole axial range of the annular outer wall 37 allowing the sealing tip 23 to be press-fitted therein. Note that the outer diameter of the sealing tip 23 is substantially constant in its axial direction.

The axial length L1 of the annular outer wall 37, cf. FIG. 5, falls within the range from 1.8 mm to 12.4 mm. The axial length L1 of the annular outer wall 37 is the length by which the annular outer wall 37 protrudes from a reference surface 45 defining the boundary between the annular outer wall 37 and the base 41.

The reference surface 45 is a plane perpendicular to the axial direction of the annular walls 5, i.e. the annular outer wall 37 and the annular inner wall 39. The reference surface 45 extends along the boundary between the annular outer wall 37 and the base 41 and along the boundary between the annular inner wall 39 and the base 41.

Figure 7:
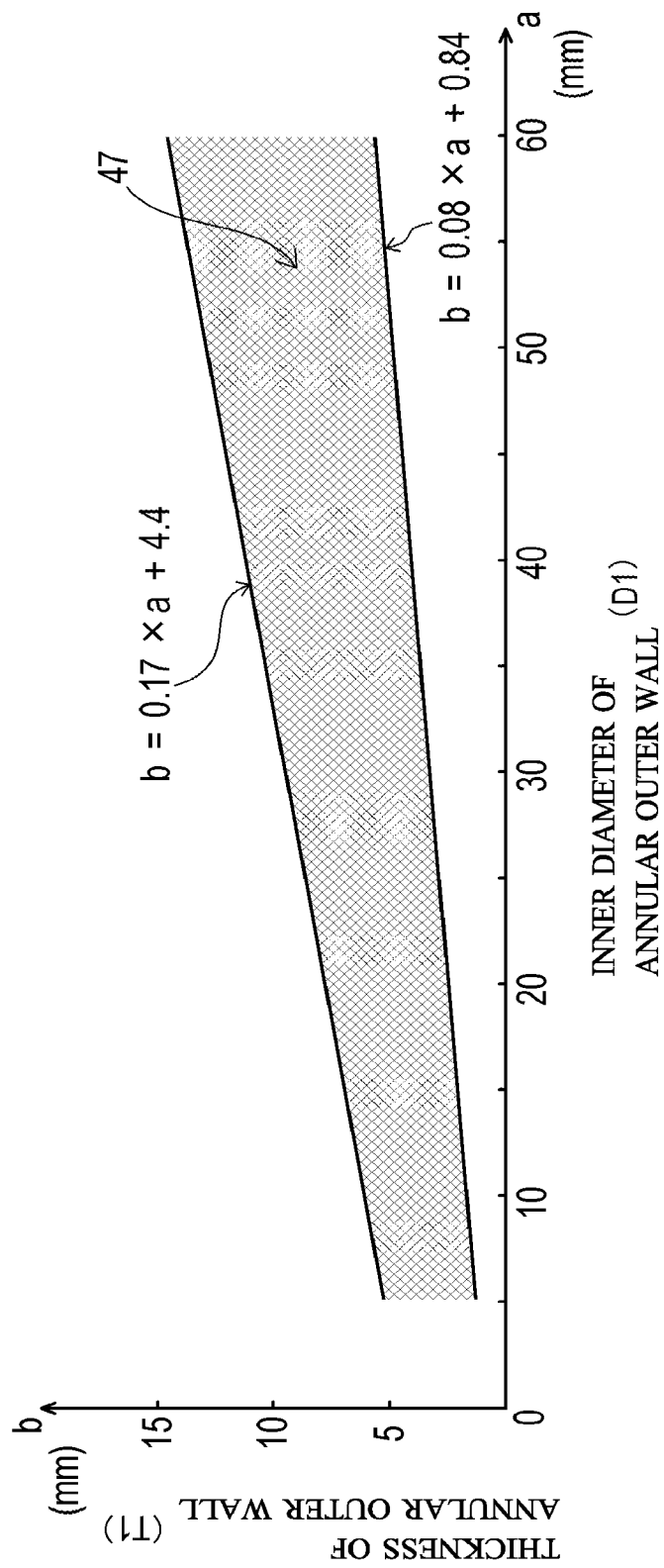
FIG. 7 is a graph of the relationship between the inner diameter and thickness of an annular outer wall of the annular walls of the block of FIG. 1.

The inner diameter D1 of the annular outer wall 37 falls within the range from 5 mm to 60 mm. Let a be the inner diameter D1 of the annular outer wall 37 and b be the thickness T1 thereof. The inner diameter D1 and thickness T1 of the annular outer wall 37 fall within a range defined by the following equations (1) and (2), i.e. the range 47 shown in FIG. 7:

$$b=0.17a+4.4, \quad (1)$$

$$b=0.08a+0.84. \quad (2)$$

Figure 8:
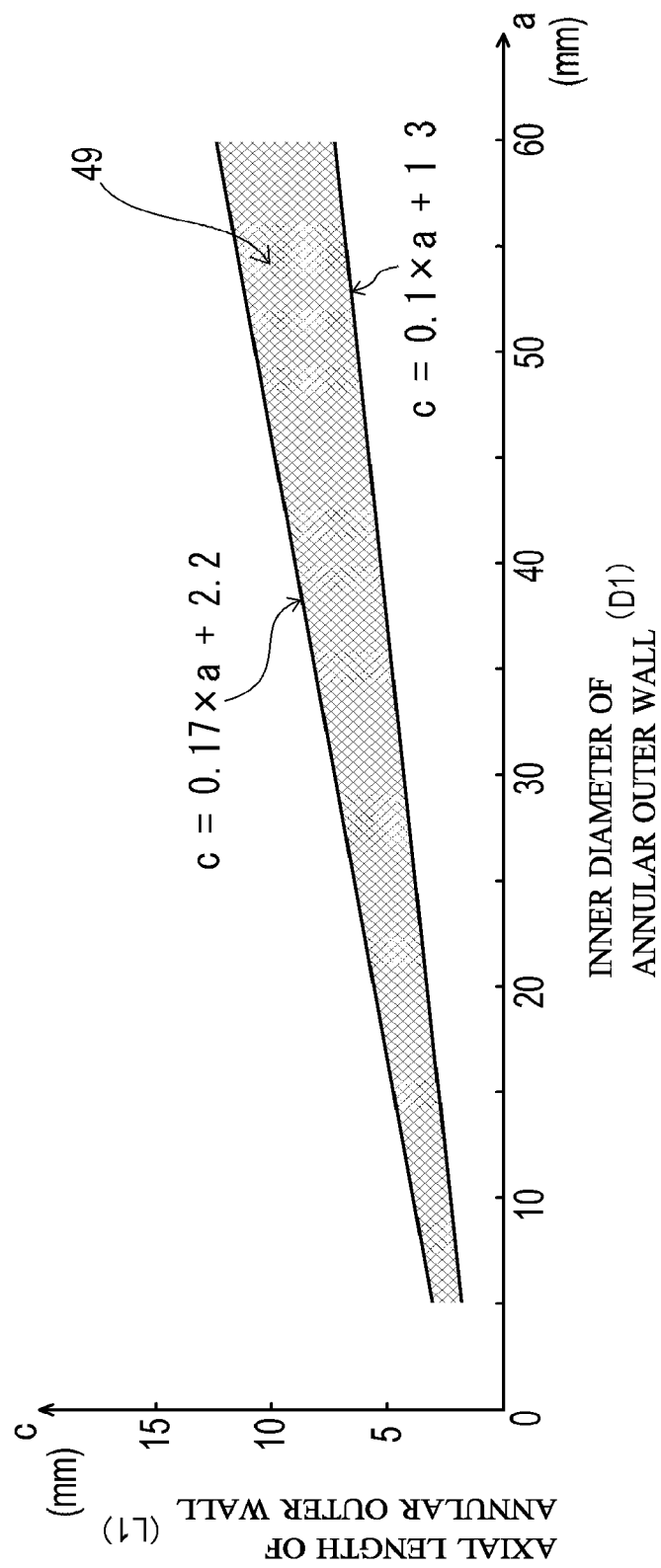
FIG. 8 is a graph of the relationship between the inner diameter and axial length of the annular outer wall of the annular walls of the block of FIG. 1.

Let c be the axial length L1 of the annular outer wall 37. The inner diameter D1 and axial length L1 of the annular outer wall 37 fall within a range defined by the following equations (3) and (4), i.e. the range 49 shown in FIG. 8:

$$c=0.17a+2.2, \quad (3)$$

$$c=0.1a+1.3. \quad (4)$$

The annular outer wall 37 is made of resin material with a modulus of elasticity of 200 MPa to 3200 MPa. Preferably, the annular outer wall 37 is made of resin material with a modulus of elasticity of 300 MPa to 2600 MPa, more preferably, with a modulus of elasticity of 310 MPa to 600 MPa. These values of the modulus of elasticity are measured by the method defined in JIS K 7161 or ASTM D638. The annular outer wall 37 can be made of, for example, fluororesin, which is thermoplastic resin and includes PFA or PTFE.

The annular outer wall 37 may be made of resin material such as PP, HDPE, LDPE, or POM.

At least an axial portion of the annular inner wall 39 can be accepted in the sealing tip 23. The annular inner wall 39 has an opening on the second axial side of the annular walls 5, i.e. on their upper side.

The annular inner wall 39 protrudes from the base 41 of the annular walls 5 upward. The annular inner wall 39 has an end surface 51, i.e. a top surface around the opening 13 of the first fluid channel 11. The end surface 51 is flat.

The annular inner wall 39 is formed in a cylindrical shape with substantially constant radial thickness. The annular inner wall 39 has an outer diameter larger than the inner diameter of the sealing tip 23 and an inner diameter substantially the same as the inner diameter of the tapered protrusion 25.

The annular inner wall 39 is placed at a distance from the annular outer wall 37 radially inward. The annular inner wall 39 is surrounded by the annular outer wall 37 and substantially coaxial with the annular outer wall 37.

The annular inner wall 39 has a tapered inner contact surface 53, which is located at the top end of the base 41 and has an inner diameter gradually increasing with increased distance from the base 41 toward the second axial direction, i.e. upward.

The inner contact surface 53 of the annular inner wall 39 faces the outer contact surface 31 of the tapered protrusion 25. The inner contact surface 53 is inclined at an angle appropriate to an angle of the outer contact surface 31 such that the inner contact surface 53 can be pressed on the outer contact surface 31.

The angle at which the inner contact surface 53 is inclined from the axis of the first fluid channel 11, i.e. the axis of the annular inner wall 39, differs from the angle at which the outer contact surface 31 is inclined from the axis of the second fluid channel 15, i.e. the axis of the tapered protrusion 25.

The angle of the inner contact surface 53 is larger than the angle of the outer contact surface 31. Alternatively, the angle of the inner contact surface 53 may be substantially the same as the angle of the outer contact surface 31.

The annular inner wall 39 is elastically deformable in its radial direction. The annular inner wall 39 is elastically deformed by the sealing tip 23, i.e. the first axial side 17 of the gasket 3, when at least an axial portion of the annular inner wall 39 is press-fitted in the sealing tip 23.

By being press-fitted in the sealing tip 23, the annular inner wall 39 can be elastically deformed in its radial direction such that a segment of the annular inner wall 39 can move separately from other segments to fit the profile of the sealing tip 23.

Suppose that the annular inner wall 39 fails to have a circular-cylindrical shape in contrast to the sealing tip 23 in a circular-cylindrical shape. In this case, some segments of the annular inner wall 39 can be elastically deformed radially outward and other segments can be elastically deformed radially inward to fit the profile of the sealing tip 23.

The thickness T2 of the annular inner wall 39, cf. FIG. 5, falls within the range from 0.72 mm to 6 mm. The thickness T2 of the annular inner wall 39 means the radial length of each segment of the annular inner wall 39.

The thickness T2 of the annular inner wall 39 is the thickness of a portion of the annular inner wall 39 press-fitted in the sealing tip 23 and is designed to be substantially constant within almost the whole axial range of the annular inner wall 39. Note that the inner diameter of the sealing tip 23 is substantially constant in its axial direction.

The axial length L2 of the annular inner wall 39, cf. FIG. 5, falls within the range from 1.76 mm to 13.2 mm. The axial length L2 of the annular inner wall 39 is the length by which the annular inner wall 39 protrudes from the reference surface 45 defining the boundary between the annular outer wall 37 and the base 41.

In view of the degree of contact between the outer contact surface 31 of the tapered protrusion 25 and the inner contact surface 53 of the annular inner wall 39, preferably, the length by which the annular inner wall 39 protrudes from the reference surface 45, i.e. the axial length L2 of the annular inner wall 39, is shorter than the length by which the annular outer wall 37 protrudes from the reference surface 45, i.e. the axial length L1 of the annular outer wall 37: L2<L1.

However, it is possible that the length by which the annular inner wall 39 protrudes from the reference surface 45, i.e. the axial length L2 of the annular inner wall 39, is equal to or longer than the length by which the annular outer wall 37 protrudes from the reference surface 45, i.e. the axial length L1 of the annular outer wall 37: L2=L1 or L2>L1.

Figure 9:
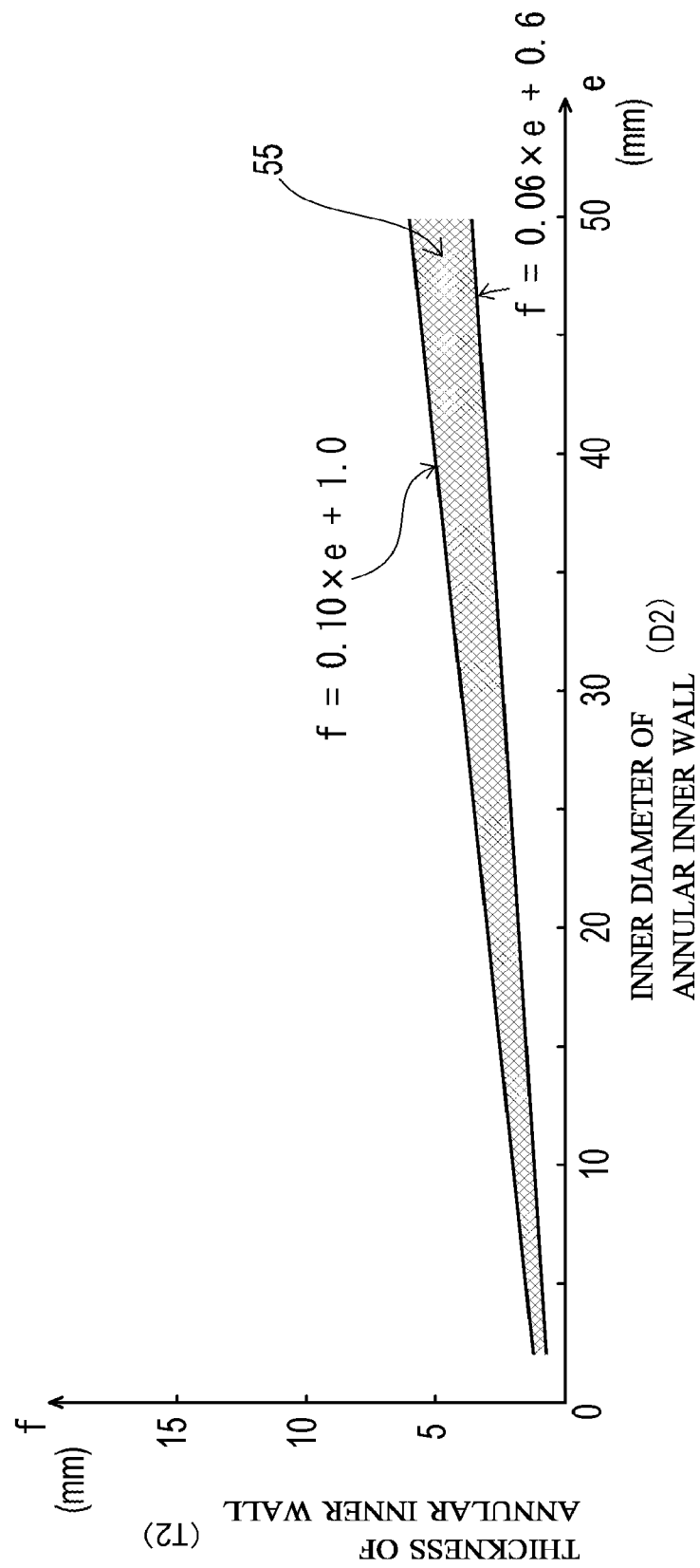
FIG. 9 is a graph of the relationship between the inner diameter and thickness of an annular inner wall of the annular walls of the block of FIG. 1.

The inner diameter D2 of the annular inner wall 39, cf. FIG. 4, falls within the range from 2 mm to 50 mm. Let e be the inner diameter D2 of the annular inner wall 39 and f be the thickness T2 thereof. The inner diameter D2 and thickness T2 of the annular inner wall 39 fall within a range defined by the following equations (5) and (6), i.e. the range 55 shown in FIG. 9:

$$f=0.10e+1.0, \quad (5)$$

$$f=0.06e+0.6. \quad (6)$$

Figure 10:
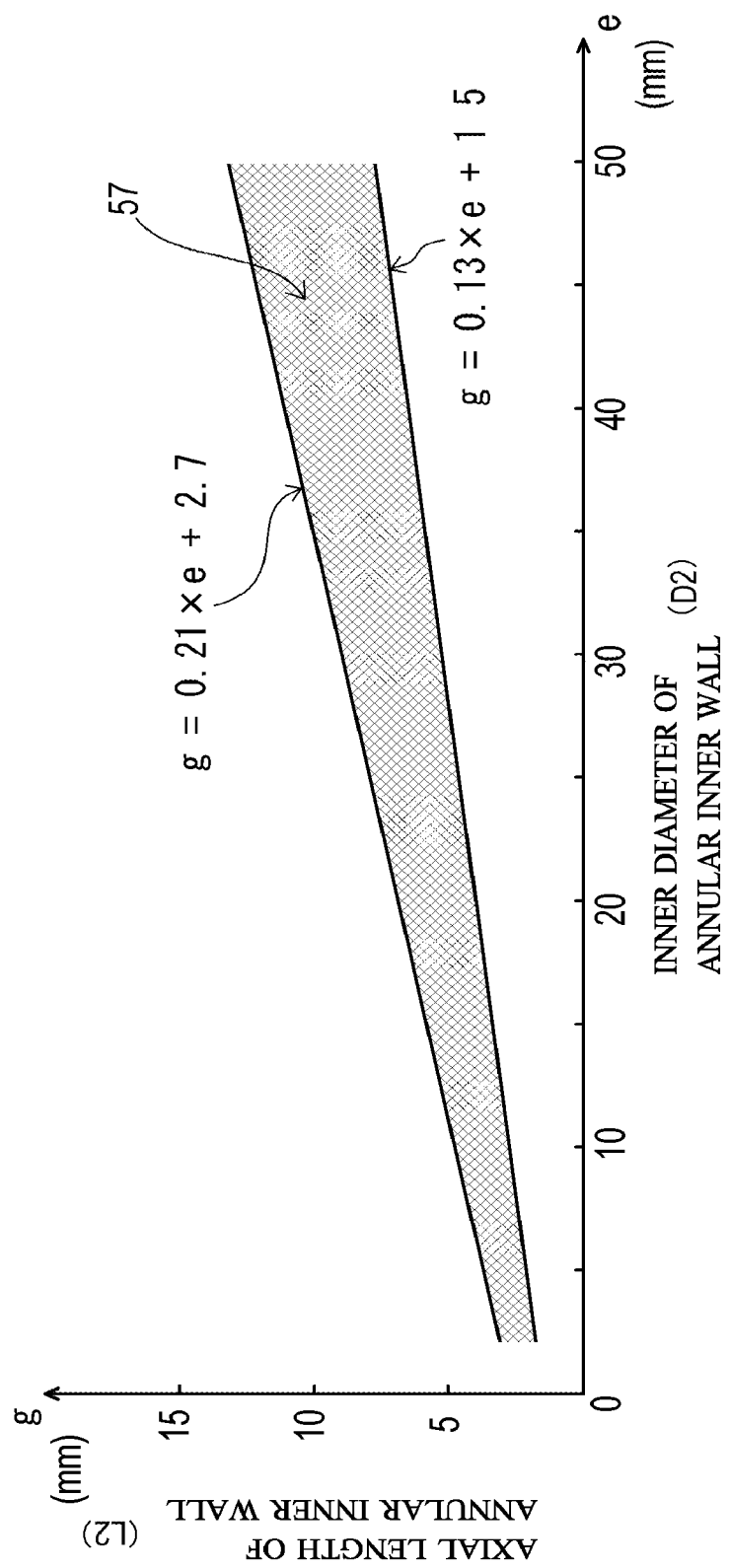
FIG. 10 is a graph of the relationship between the inner diameter and axial length of the annular inner wall of the annular walls of the block of FIG. 1.

Let g be the axial length L2 of the annular inner wall 39. The inner diameter D2 and axial length L2 of the annular inner wall 39 fall within a range defined by the following equations (7) and (8), i.e. the range 57 shown in FIG. 10:

$$g=0.21e+2.7, \quad (7)$$

$$g=0.13e+1.5. \quad (8)$$

The annular inner wall 39 is made of resin material with a modulus of elasticity of 200 MPa to 3200 MPa. These values of the modulus of elasticity are measured by the above-mentioned method. The annular inner wall 39 can be made of, for example, fluororesin including PFA or PTFE.

As usage, the annular inner wall 39 may be made of another resin material such as PP HDPE, LDPE, or POM.

As described above, the annular outer wall 37 and the annular inner wall 39 allow the sealing tip 23, i.e. the first axial side 17 of the gasket 3, to be press-fitted therebetween.

A groove 61 is formed between the annular outer wall 37 and the annular inner wall 39. The groove 61 has a bottom and an opening on the second axial side of the annular outer wall 37 and the annular inner wall 39, i.e. on their upper side.

The opening 63 of the groove 61 is located at the tip of the annular inner wall 39, and a bottom 65 of the groove 61 is located at the base of the annular inner wall 39. The groove 61 allows the sealing tip 23 to be press-fitted therein through the opening 63.

The groove 61 is formed in a ring shape with a substantially constant radial width W1 between the annular outer wall 37 and the annular inner wall 39, which are almost parallel to each other as shown in FIG. 6.

In the opening 63, portions nearer to the second axial end of the annular inner wall 39 have larger radial widths. This is because the outer periphery of the annular inner wall 39 is tapered near the end surface 51.

As shown in FIG. 6, the width W1 of the groove 61 is smaller than the thickness T3 of the sealing tip 23. The width W1 can be appropriately determined such that the groove 61 allows the sealing tip 23 to be press-fitted therein.

The width W1 of the groove 61 is substantially constant within almost the whole axial range of the annular outer wall 37 and the annular inner wall 39. The width W1 of the groove 61 is the radial length of each segment of the groove 61.

The thickness T3 of the sealing tip 23 is substantially constant within almost the whole axial range of the sealing tip 23. The thickness T3 of the sealing tip 23 is the radial length of each segment of the sealing tip 23.

Across the groove 61, the annular outer wall 37 and the annular inner wall 39 are located at a radial distance from each other. The thickness T2 of the annular inner wall 39 is smaller than the thickness T1 of the annular outer wall 37.

Figure 11:
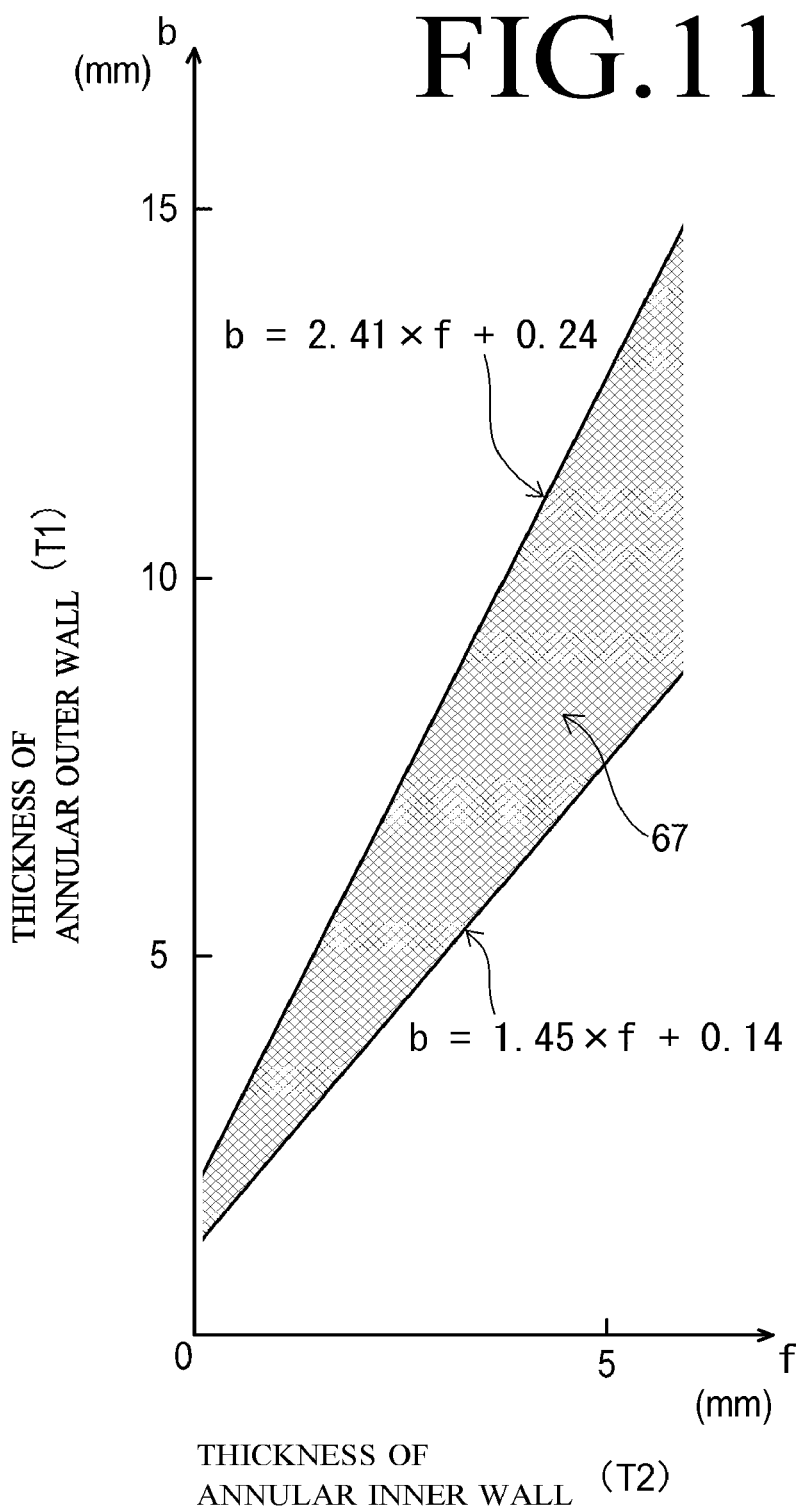
FIG. 11 is a graph of the relationship between the thickness of the annular outer wall and the thickness of the annular inner wall of the annular walls of the block of FIG. 1.

The thickness T2 of the annular inner wall 39 falls within the range from 0.72 mm to 6 mm. Let b be the thickness T1 of the annular outer wall 37 and f be the thickness T2 of the annular inner wall 39. The thickness T1 of the annular outer wall 37 and the thickness T2 of the annular inner wall 39 fall within a range defined by the following equations (9) and (10), i.e. the range 67 shown in FIG. 11:

$$b=2.41f+0.24, \quad (9)$$

$$b=1.45f+0.14. \quad (10)$$

The thicknesses of the annular outer wall 37 and the annular inner wall 39 can be appropriately adjusted such that the annular inner wall 39 is thinner than the annular outer wall 37.

The above-described structure enables the gasket 3 to be mounted on the block 1 such that the first axial side 17 of the gasket 3, i.e. the sealing tip 23, is press-fitted inside the annular outer wall 37 of the annular walls 5 of the block 1, and at least an axial portion of the annular inner wall 39 is press-fitted inside the sealing tip 23. In other words, the sealing tip 23 is press-fitted between the annular outer wall 37 and the annular inner wall 39, i.e. in the groove 61.

When the gasket 3 is mounted on the block 1, the outer contact surface 27 of the sealing tip 23 of the gasket 3 can be pressed on the inner contact surface 71 of the annular outer wall 37 of the block 1, and the inner contact surface 29 of the sealing tip 23 can be pressed on the outer contact surface 73 of the annular inner wall 39 of the block 1. When the block 1 is coupled to the other block 7, the outer contact surface 31 of the tapered protrusion 25 of the gasket 3 can be pressed on the inner contact surface 53 of the annular inner wall 39.

In those manners, the structure for mounting the gasket 3 on the block 1 can exert a radial sealing force between the sealing tip 23 and each of the annular outer wall 37 and the annular inner wall 39 to seal gaps therebetween. The structure can also exert an axial sealing force between the tapered protrusion 25 and the annular inner wall 39 to seal gaps therebetween.

When the sealing tip 23 is press-fitted inside the annular outer wall 37 or the annular inner wall 39 is press-fitted inside the sealing tip 23, the sealing tip 23 can elastically deform at least one of the annular outer wall 37 and the annular inner wall 39 in the radial direction to fit the profile of the sealing tip 23. This enables the annular outer wall 37 and the annular inner wall 39 to change their shapes flexibly to the profile of the sealing tip 23.

Even if there is a large difference in radial shape between the sealing tip 23 and the annular outer wall 37, the sealing tip 23 can elastically deform the annular outer wall 37 in its radial direction to cause the radial shape of the annular outer wall 37 to fit the radial shape of the sealing tip 23. This enables the annular outer wall 37 to change its shape flexibly to the profile of the sealing tip 23.

Even if there is a large difference in radial shape between the annular inner wall 39 and the sealing tip 23, the sealing tip 23 can elastically deform the annular inner wall 39 in its radial direction to cause the radial shape of the annular inner wall 39 to fit the radial shape of the sealing tip 23. This enables the annular inner wall 39 to change its shape flexibly to the profile of the sealing tip 23.

As a result, the sealing tip 23 can be smoothly press-fitted inside the annular outer wall 37 or the annular inner wall 39 can be smoothly press-fitted inside the sealing tip 23. After that, the sealing tip 23 can press substantially the whole periphery of at least one of the annular outer wall 37 and the annular inner wall 39 by a substantially uniform force. This enables the gasket 3 mounted on the block 1 to achieve higher sealing performance.

Both the annular outer wall 37 and the annular inner wall 39 presses the sealing tip 23 after the first axial side 17 of the gasket 3, i.e. the sealing tip 23, is press-fitted in the block 1. Alternatively, either the annular outer wall 37 or the annular inner wall 39 may press the sealing tip 23.

The structure for mounting the gasket 3 on the block 1 is applicable to the structure for mounting the gasket 3 on the other block 7 as shown in FIG. 1. This is not a limited condition. Instead of the other block 7, a regulator, a pressure gauge, a valve, a flowmeter, a resin tube, or the like may be connected with the structure for mounting the gasket 3 on the block 1.

The annular outer and inner walls according to the invention only have to allow the first axial side of the gasket to be at least partially press-fitted therebetween. In the embodiment, the annular outer wall 37 and the annular inner wall 39 only have to allow the sealing tip 23 to be at least partially press-fitted therebetween.

FIGS. 12 to 17 are cross-sectional views showing different examples of designs of the annular walls 5 of the block 1, i.e. the annular outer wall 37 and the annular inner wall 39, and the first axial side 17 of the gasket 3, esp. the sealing tip 23.

If the annular walls 5 of the block 1 and the first axial side 17 of the gasket 3 meet the above-described conditions for their thickness, they may be designed as shown in any of FIGS. 12 to 17, instead of the design shown in FIG. 6.

Figure 12:
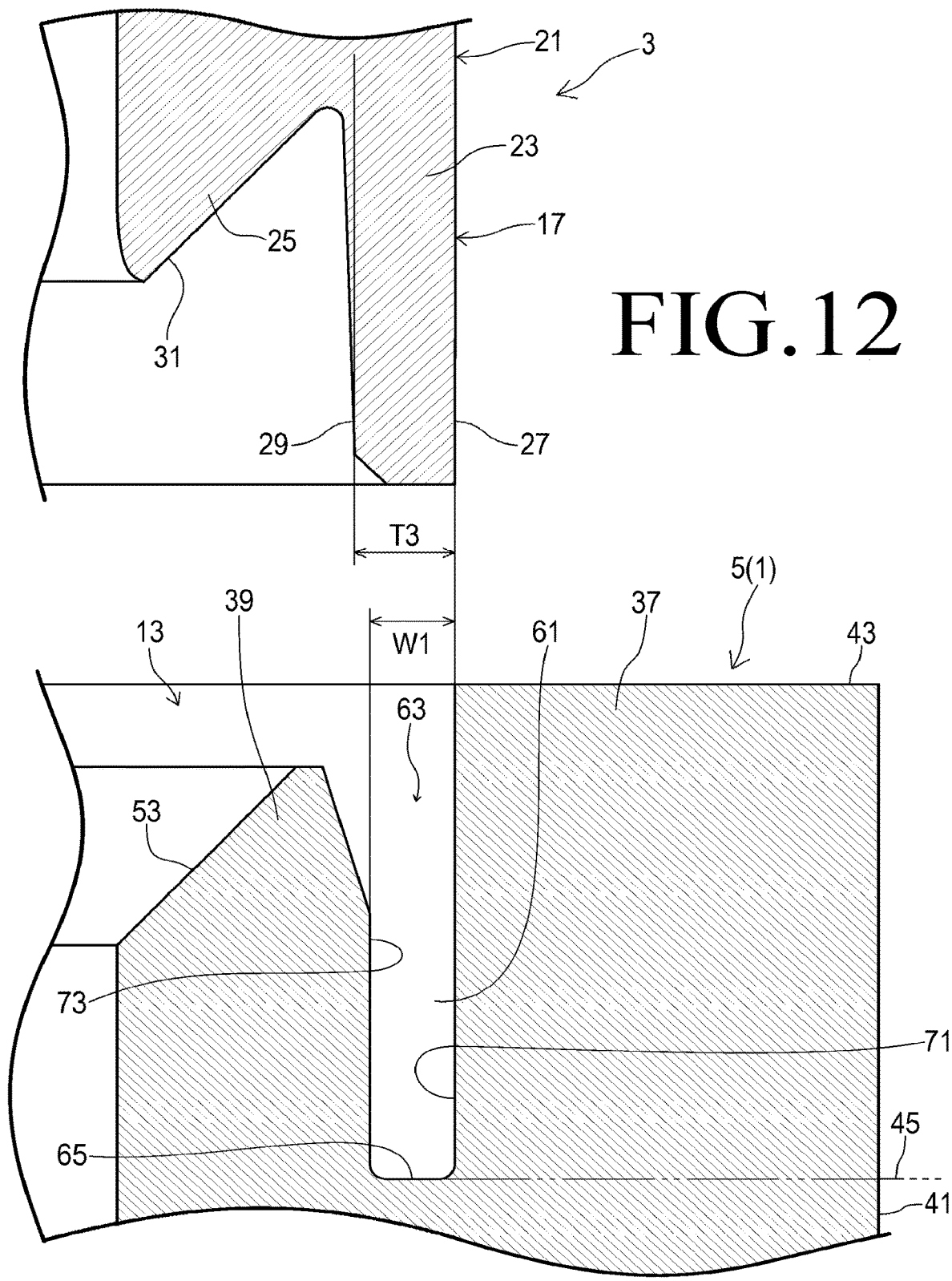
FIG. 12 is a cross-sectional view of a second example showing a design of the annular walls of the block and the first axial side of the gasket of FIG. 1.
Figure 13:
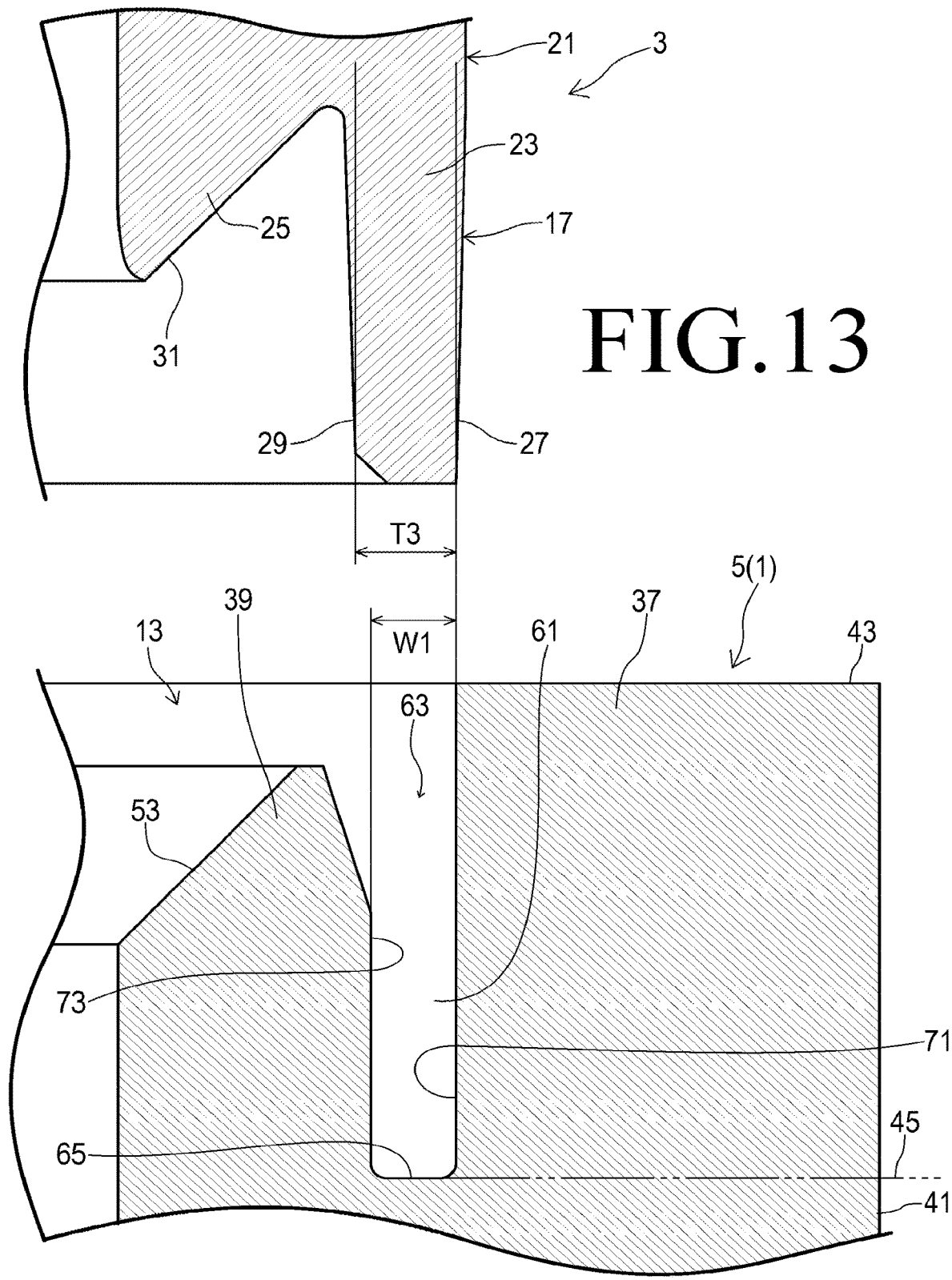
FIG. 13 is a cross-sectional view of a third example showing a design of the annular walls of the block and the first axial side of the gasket of FIG. 1.

As shown in FIGS. 12 and 13, the sealing tip 23 may be formed in a tapered shape such that its thickness decreases with decreased distance from its first axial end, i.e. its lower end. Such a shape enables a larger volume of the sealing tip 23 to collapse when the sealing tip 23 is press-fitted in the annular walls 5.

For example, the thickness of the sealing tip 23 may be designed to be the above-mentioned one T3 or more as shown in FIG. 12. The inner diameter of the sealing tip 23 may gradually increase with increased distance from the axially intermediate portion 21 of the gasket 3 toward the first axial end, i.e. downward.

In addition to the structural feature of FIG. 12, as shown in FIG. 13, the outer diameter of the sealing tip 23 may gradually reduce with increased distance from the axially intermediate portion 21 of the gasket 3 toward the first axial end.

Figure 14:
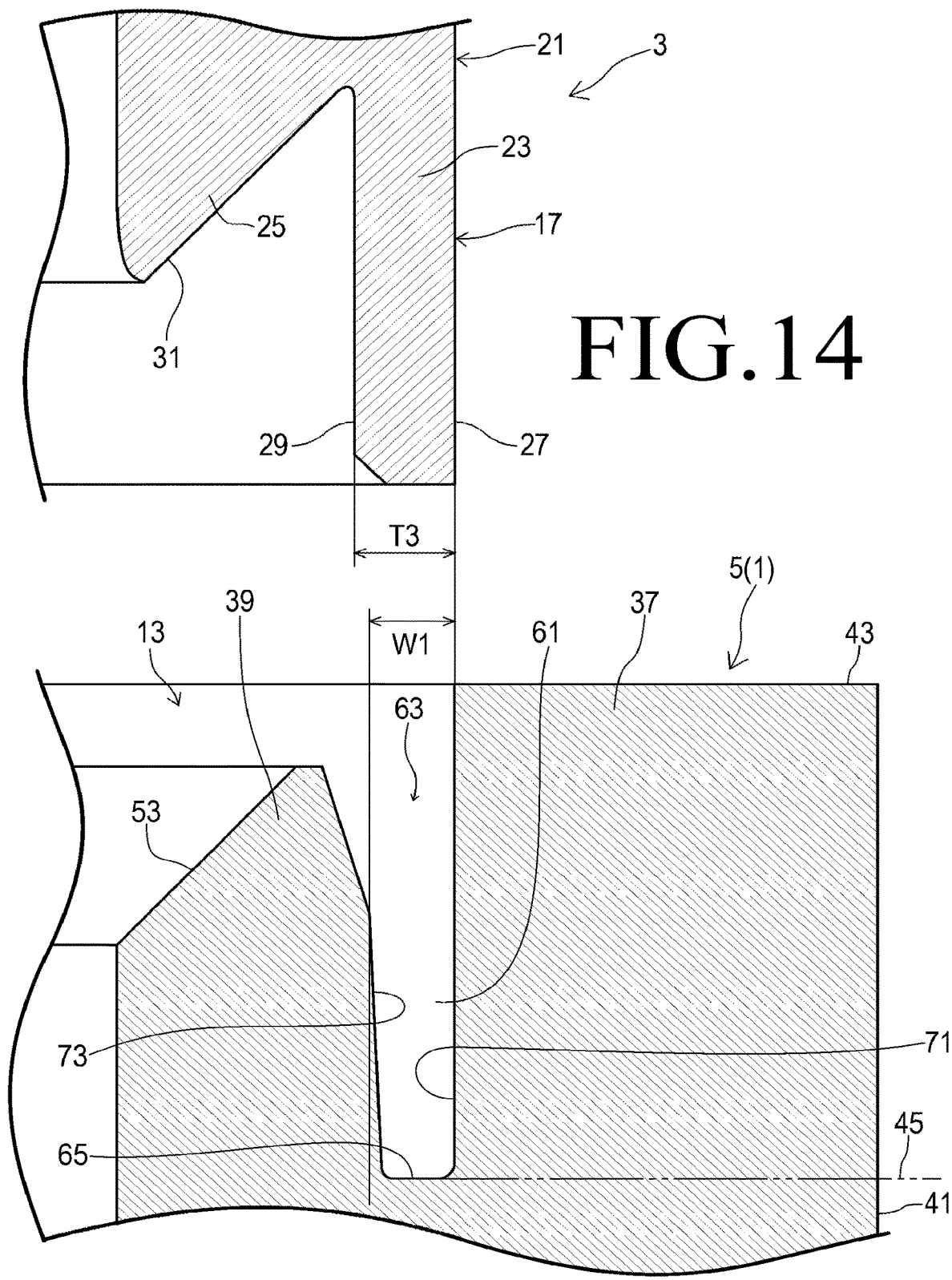
FIG. 14 is a cross-sectional view of a fourth example showing a design of the annular walls of the block and the first axial side of the gasket of FIG. 1.
Figure 15:
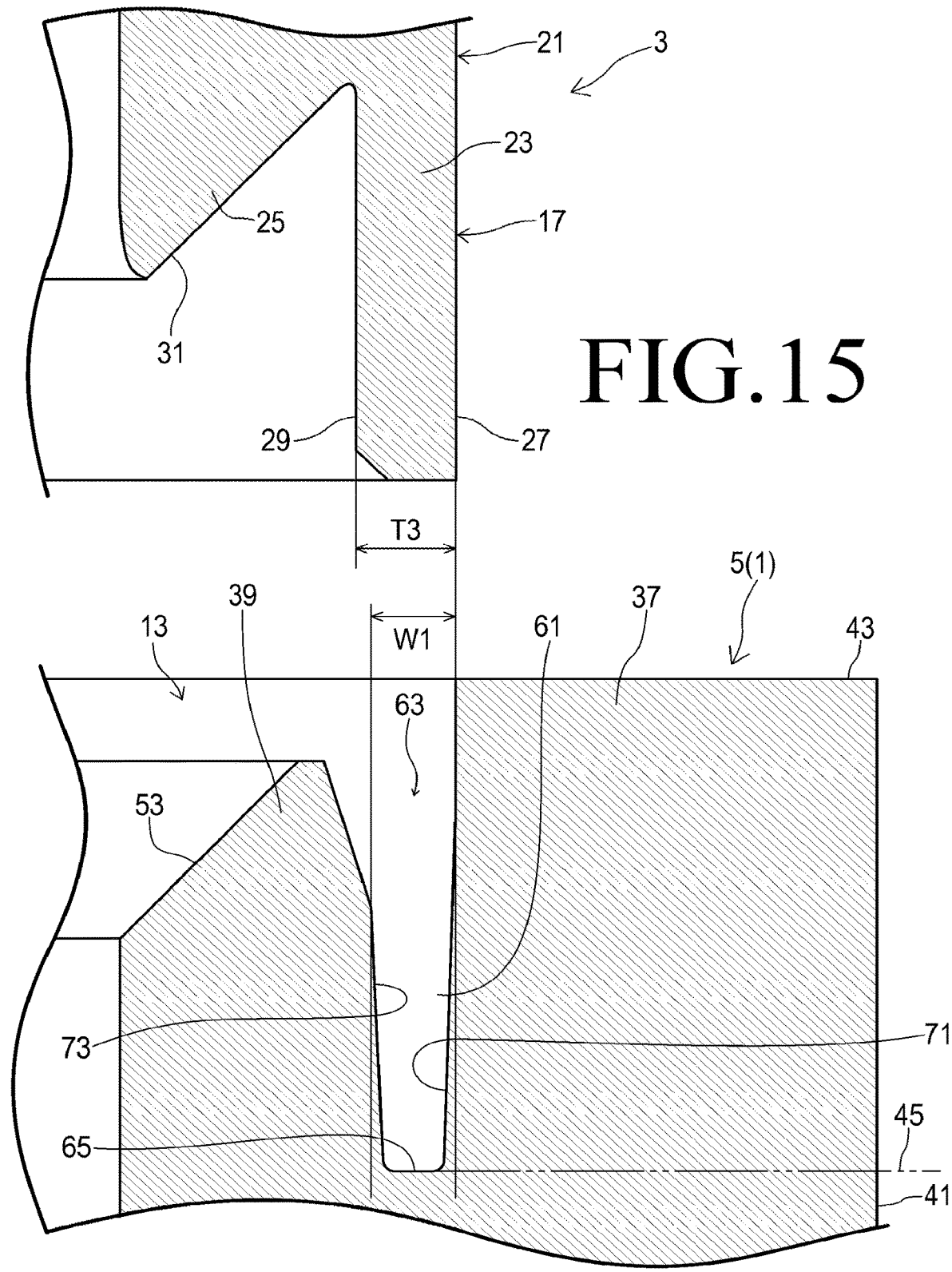
FIG. 15 is a cross-sectional view of a fifth example showing a design of the annular walls of the block and the first axial side of the gasket of FIG. 1.

As shown in FIGS. 14 and 15, the groove 61 may be formed in a tapered shape such that its width decreases with decreased axial distance from its bottom 65. Such a shape enables a larger volume of the annular walls 5 to collapse when the sealing tip 23 is press-fitted in the annular walls 5.

For example, the width of the groove 61 may be designed to be the above-mentioned one W1 or less as shown in FIG. 14. The outer diameter of the annular inner wall 39 may gradually increase with increased distance from the end surface 51 toward the reference surface 45 and the base 41, i.e. downward.

In addition to the structural feature of FIG. 14, as shown in FIG. 15, the inner diameter of the annular outer wall 37 may gradually reduce with increased distance from the end surface 43 toward the reference surface 45 and the base 41.

Figure 16:
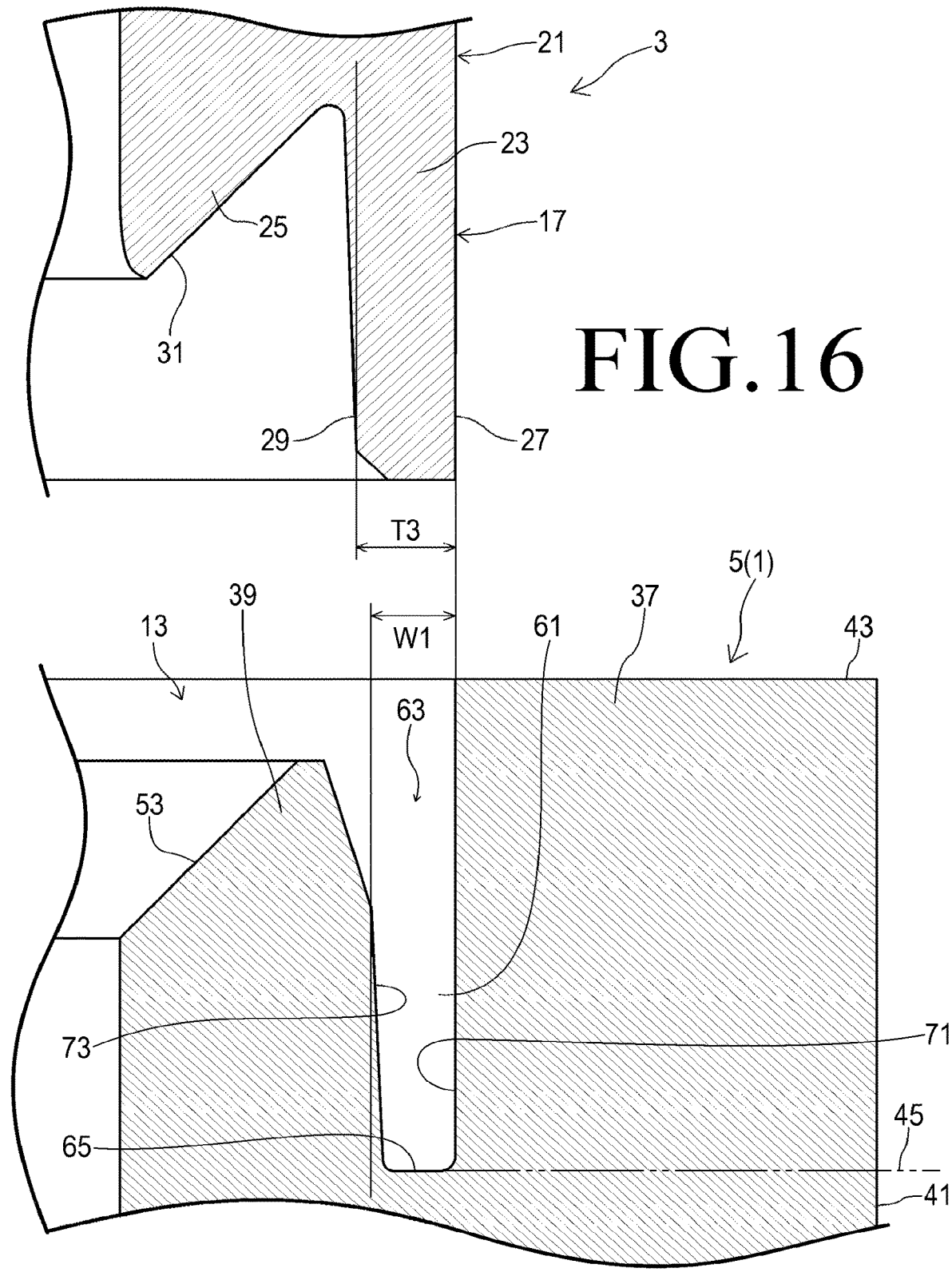
FIG. 16 is a cross-sectional view of a sixth example showing a design of the annular walls of the block and the first axial side of the gasket of FIG. 1.
Figure 17:
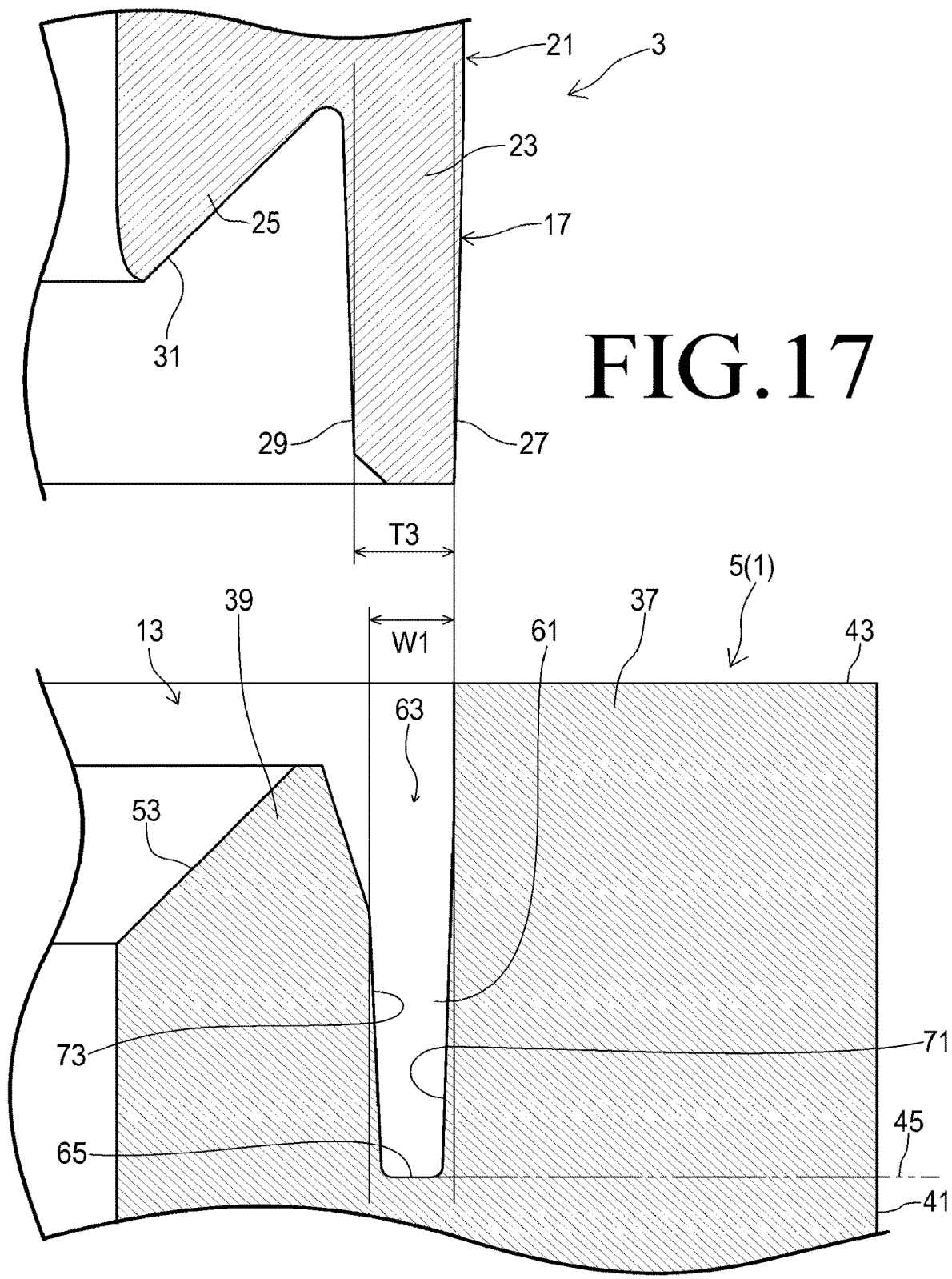
FIG. 17 is a cross-sectional view of a seventh example showing a design of the annular walls of the block and the first axial side of the gasket of FIG. 1.

As shown in FIGS. 16 and 17, both the sealing tip 23 and the groove 61 may be formed in the above-described tapered shapes. The combination of the designs of FIGS. 12 and 14 or the combination of the designs of FIGS. 13 and 15 is applicable.

In view of the above-described teaching, it is obvious that the invention has many variations and modifications. Accordingly, it should be understood that the invention can be embodied in manners other than the embodiments described in this specification within the scope of the attached claims.

DESCRIPTION OF REFERENCE SYMBOLS 1 block, 3 gasket, 5 annular wall, 11 first fluid channel, 13 opening, 17 first axial side of gasket, 37 annular outer wall, 39 annular inner wall, D1 inner diameter of annular outer wall, D2 inner diameter of annular inner wall, L1 axial length of annular outer wall, L2 axial length of annular inner wall, T1 thickness of annular outer wall, T2 thickness of annular inner wall

The invention claimed is:

1. A structure for mounting a gasket on a block, comprising:
a block including:
a fluid channel,
an annular inner wall made of resin and located radially outside an opening of the fluid channel, and
an annular outer wall made of resin and located radially outside the annular inner wall; and
an annular gasket surrounding the opening of the fluid channel,
wherein
the annular inner wall and the annular outer wall allow an axial side of the gasket to be press-fitted therebetween and are elastically deformable in their radial directions,
the annular inner wall has a radial thickness of 0.72 mm to 6 mm,
the radial thickness of the annular inner wall is smaller than a radial thickness of the annular outer wall, and
the radial thickness, f, of the annular inner wall and the radial thickness, b, of the annular outer wall fall within a range defined by the following equations (1) and (2):

$$b = 2.41f + 0.24, \quad (1)$$

$$b = 1.45f + 0.14. \quad (2)$$

2. The structure according to claim 1, wherein the radial thickness of the annular outer wall is 1.24 mm to 14.6 mm.

3. The structure according to claim 1, wherein the annular inner wall and the annular outer wall protrude from a reference surface, which is perpendicular to their respective axial directions, to the same direction, the annular inner wall protrudes from the reference surface by 1.76 mm to 13.2 mm, and
the annular outer wall protrudes from the reference surface by 1.8 mm to 12.4 mm.

4. A structure for mounting a gasket on a block, comprising:
a block including:
a fluid channel, and
an annular wall made of resin and located radially outside an opening of the fluid channel; and
a gasket surrounding the opening of the fluid channel and having an axial side radially inside the annular wall,
wherein
the annular wall allows the axial side of the gasket to be press-fitted therein and is elastically deformable in its radial direction,
the annular wall has an inner diameter of 5 mm to 60 mm and a radial thickness of 1.24 mm to 14.6 mm, and
the inner diameter, a, of the annular wall and the radial thickness, b, of the annular wall fall within a range defined by the following equations (3) and (4):

$$b = 0.17a + 4.4, \quad (3)$$

$$b = 0.08a + 0.84. \quad (4)$$

5. The structure according to claim 4, wherein the annular wall is made of a material with a modulus of elasticity of 200 MPa to 3200 MPa.

6. A structure for mounting a gasket on a block, comprising:
   a block including:
      a fluid channel, and
      an annular wall made of resin and located radially outside an opening of the fluid channel; and
   a gasket surrounding the opening of the fluid channel and having an axial side radially inside the annular wall,
   wherein
   the annular wall allows the axial side of the gasket to be press-fitted therein and is elastically deformable in its radial direction,
   the annular wall has an inner diameter of 5 mm to 60 mm and an axial length of 1.8 mm to 12.4 mm, and
   the inner diameter, a, of the annular wall and the axial length, c, of the annular wall fall within a range defined by the following equations (5) and (6):

$$c=0.17a+2.2, \tag{5}$$

$$c=0.1a+1.3. \tag{6}$$

7. The structure according to claim 6, wherein the annular wall is made of a material with a modulus of elasticity of 200 MPa to 3200 MPa.

8. A structure for mounting a gasket on a block, comprising:
   a block including:
      a fluid channel, and
      an annular wall made of resin and located radially outside an opening of the fluid channel; and
   a gasket surrounding the opening of the fluid channel and having an axial side radially outside the annular wall,
   wherein
   at least a portion of the annular wall is press-fitted in the axial side of the gasket and is elastically deformable in its radial direction,
   the annular wall has an inner diameter of 2 mm to 50 mm and a radial thickness of 0.72 mm to 6 mm, and
   the inner diameter, e, of the annular wall and the radial thickness, f, of the annular wall fall within a range defined by the following equations (7) and (8):

$$f=0.10e+1.0, \tag{7}$$

$$f=0.06e+0.6. \tag{8}$$

9. The structure according to claim 8, wherein the annular wall is made of a material with a modulus of elasticity of 200 MPa to 3200 MPa.

10. A structure for mounting a gasket on a block, comprising:
   a block including:
      a fluid channel, and
      an annular wall made of resin and located radially outside an opening of the fluid channel; and
   a gasket surrounding the opening of the fluid channel and having an axial side radially outside the annular wall,
   wherein
   at least a portion of the annular wall is press-fitted in the axial side of the gasket and is elastically deformable in its radial direction,
   the annular wall has an inner diameter of 2 mm to 50 mm and an axial length of 1.76 mm to 13.2 mm, and
   the inner diameter, e, of the annular wall and the axial length, g, of the annular wall fall within a range defined by the following equations (9) and (10):

$$g=0.21e+2.7, \tag{9}$$

$$g=0.13e+1.5. \tag{10}$$

11. The structure according to claim 10, wherein the annular wall is made of a material with a modulus of elasticity of 200 MPa to 3200 MPa.

* * * * *